(12) United States Patent
Maarek et al.

(10) Patent No.: US 9,838,348 B2
(45) Date of Patent: Dec. 5, 2017

(54) ELECTRONIC MESSAGE SEARCH SYSTEM AND METHOD

(71) Applicant: YAHOO HOLDINGS, INC., Sunnyvale, CA (US)

(72) Inventors: Yoelle Maarek, Haifa (IL); Liane Lewin-Eytan, Binyamina (IL); Ariel Raviv, Haifa (IL); David Carmel, Haifa (IL); Guy Halawi, Ramat Gan (IL); Zohar Karnin, Herzelia, IL (US); Peter Monaco, Los Altos, CA (US)

(73) Assignee: YAHOO HOLDINGS, INC., Sunnyvale, CA (US)

( * ) Notice: Subject to any disclaimer, the term of this patent is extended or adjusted under 35 U.S.C. 154(b) by 388 days.

(21) Appl. No.: 14/587,585

(22) Filed: Dec. 31, 2014

(65) Prior Publication Data

US 2016/0188599 A1    Jun. 30, 2016

(51) Int. Cl.
   *G06F 17/30* (2006.01)
   *H04L 12/58* (2006.01)

(52) U.S. Cl.
   CPC ........ *H04L 51/22* (2013.01); *G06F 17/30979* (2013.01)

(58) Field of Classification Search
   CPC ......... G06F 17/30979; G06F 17/30731; G06F 17/30637; G06F 17/30693; G06F 17/30991; H04L 51/22; H04L 63/0227; H04L 67/22
   USPC ....................................................... 707/728
   See application file for complete search history.

(56) References Cited

U.S. PATENT DOCUMENTS

| | | | |
|---|---|---|---|
| 6,012,053 A | 1/2000 | Pant et al. | |
| 7,117,207 B1* | 10/2006 | Kerschberg | G06F 17/30702 |
| 7,346,613 B2 | 3/2008 | Hurst-Hiller et al. | |
| 7,693,825 B2 | 4/2010 | Wang et al. | |
| 8,375,048 B1* | 2/2013 | Wad | G06F 17/30672 |
| | | | 707/708 |
| 8,645,300 B1* | 2/2014 | Cowdrey | G06F 17/30861 |
| | | | 706/46 |
| 2006/0047635 A1* | 3/2006 | Kraenzel | G06F 17/30867 |
| 2006/0064411 A1* | 3/2006 | Gross | G06F 17/30864 |

(Continued)

FOREIGN PATENT DOCUMENTS

JP    2007034961 A    2/2007

OTHER PUBLICATIONS

International Search Report to corresponding International Application No. PCT/US2015/067993 dated Apr. 18, 2016.

*Primary Examiner* — Thanh-Ha Dang
(74) *Attorney, Agent, or Firm* — James J. DeCarlo; Greenberg Traurig, LLP

(57) ABSTRACT

A search query for searching electronic messages, such as email, may be used to search for different types of items, such as and without limitation electronic messages, contacts, photos, documents, such as and without limitation papers, presentations, etc., business entities, personal information extracted from messages, such as and without limitation purchase orders, shipments, reservations, travel itineraries, etc. Several sources of data, which may be indexed for searching, such as and without limitation a personal mail search index, contacts, or business entity, index, attachments index, extracted data index, etc. may be searched using the search query. A number of top search result items, which may include different types of items, may be presented apart from other search result items.

21 Claims, 10 Drawing Sheets

(56) References Cited

U.S. PATENT DOCUMENTS

| | | | | |
|---|---|---|---|---|
| 2007/0185847 A1* | 8/2007 | Budzik | ............. | G06F 17/30389 |
| 2008/0114751 A1* | 5/2008 | Cramer | ............. | G06F 17/30554 |
| 2008/0301281 A1* | 12/2008 | Wang | ................. | G06F 21/56 |
| | | | | 709/224 |
| 2009/0049032 A1* | 2/2009 | Maghoul | ............. | G06F 17/3087 |
| 2010/0306191 A1* | 12/2010 | LeBeau | ............. | G06F 17/30864 |
| | | | | 707/723 |
| 2011/0208715 A1* | 8/2011 | Ni | .................... | G06F 17/30867 |
| | | | | 707/709 |
| 2011/0276396 A1* | 11/2011 | Rathod | ............. | G06F 17/30867 |
| | | | | 705/14.49 |
| 2012/0084291 A1* | 4/2012 | Chung | ................. | G06F 17/301 |
| | | | | 707/741 |
| 2012/0150850 A1* | 6/2012 | Parthasarathy | ... | G06F 17/30867 |
| | | | | 707/728 |
| 2012/0158702 A1 | 6/2012 | Kumar et al. | | |
| 2012/0158765 A1* | 6/2012 | Kumar | ............. | G06F 17/30646 |
| | | | | 707/766 |
| 2012/0323828 A1* | 12/2012 | Sontag | ............. | G06F 17/30011 |
| | | | | 706/12 |
| 2013/0054589 A1 | 2/2013 | Cheslow | | |
| 2014/0101119 A1 | 4/2014 | Li et al. | | |
| 2014/0129942 A1* | 5/2014 | Rathod | ............. | H04N 21/44222 |
| | | | | 715/720 |
| 2014/0149390 A1* | 5/2014 | Chen | ................. | G06F 17/30867 |
| | | | | 707/722 |
| 2014/0149399 A1 | 5/2014 | Kurzion | | |
| 2015/0032717 A1* | 1/2015 | Cramer | ............. | G06F 17/30867 |
| | | | | 707/709 |
| 2015/0142776 A1* | 5/2015 | Solheim | ........... | G06F 17/30011 |
| | | | | 707/722 |
| 2015/0199402 A1* | 7/2015 | Agrawal | ........... | G06F 17/30424 |
| | | | | 707/723 |
| 2015/0227633 A1* | 8/2015 | Shapira | ............. | G06F 17/30395 |
| | | | | 707/706 |
| 2016/0005004 A1* | 1/2016 | Trabue | ................ | G06Q 10/1095 |
| | | | | 705/7.19 |
| 2016/0179953 A1* | 6/2016 | Klotz, Jr. | .......... | G06F 17/30864 |
| | | | | 707/722 |

* cited by examiner

ELECTRONIC MESSAGE SEARCH SYSTEM AND METHOD

FIELD OF THE DISCLOSURE

The present disclosure relates to searching, and more particularly to searching electronic messaging items, such as electronic mail messaging items.

BACKGROUND

While there are a number of different ways in which users communicate electronically, electronic mail, or email, has remained one of the most widely used ways in which to communicate electronically.

SUMMARY

Mail traffic has grown to be a medium of choice for persistent and asynchronous communication by computer users, in personal, business, professional etc. settings. Electronic mail data stores, which may comprise email items stored in one or more electronic folders, such as an email inbox, sent items, saved items, etc., are sources of a vast array of information. An electronic mail data store may include various types of data, such as and without limitation electronic messages, message attachments, such as photos or other content, documents, etc., messaging content such as orders, receipts, travel reservations, calendar entries, appointments, engagements, and the like.

While there is a vast amount of data stored in electronic mail data stores, searching through the data to find information is difficult. One approach is to prioritize recall over precision, such that the search results returned in response to a query of a mail data store includes all electronic mail messages identified in a search of the mail data store using the user's search criteria. The set of search results are typically provided to the user as a list of messages sorted in reverse chronological order. The user is then left with the task of sifting through the search results to find the desired electronic mail message, or messages, an attachment, messaging content, etc.

It should be appreciated how this approach to searching is not optimal, and becomes less optimal as the electronic mail data store increases in size. In addition, electronic messages are the only item of retrieval in a re-find search; however, an electronic mail data store has become a store of items other than electronic mail messages, such as contacts, photographs, attachments, machine-generated receipts, such as receipts, travel itineraries, etc. A mail data store search that fails to take into account an intent of the user with respect to the type of item, or object, the user is seeking to find is not optimal. Furthermore, a mail data store search that fails to provide relevance ranking that takes into account different types of items in an electronic mail data store and/or fails in its attempt to retrieve the item that the user intends to refind is not optimal. It would be beneficial to have the ability to identify one or more items highly relevant to a search query in response to a request to search an electronic mail data store.

The present disclosure seeks to address failings in the art and to provide an effective an efficient manner for accessing items, including messages, in an electronic mail data store. An item may include any type of item that is stored in an electronic mail data store, including without limitation an electronic mail message and its component parts, attachments, message content, etc.

In accordance with one or more embodiments of the present disclosure, a list of search results identifying one or more result objects considered to be the most relevant to the user's search query is identified for presentation in response to a search request comprising a search query. In accordance with one or more such embodiments, the most relevant result(s), each of which are may be referred to herein as a hero result, may be emphasized at the top of a standard ranked list of results. The number of hero results may vary from none to one or more. A threshold number of hero results may be selected. Each hero result may have a selection score that satisfies a selection score threshold.

In accordance with one or more embodiments, a method is provided, the method comprising receiving, by a computing device, an electronic messaging search request to search at least one electronic data store comprising different types of items including a message item type, the search request comprising a user's search query; identifying, by the computing device, a plurality of search intents for the search query using the search query, each search intent corresponding to an item type; generating, by the computing device, a plurality of search result lists by performing a plurality of searches of the at least one electronic data store, each search of the plurality of searches generating a search result list of items having an object type corresponding to a search intent of the plurality of search intents and identifying a relevance score for each search result item in the search intent's search result list, the search result item's relevance score indicating the search result item's relevance to the search query; generating, by the computing device and for each search intent of the plurality of search intents, a search intent score; generating, by the computing device, a plurality of candidate scores, each candidate score corresponding to a search result item included in a search result list of the plurality of search result lists, each search result item's score is generated using the search result item's relevance score and the search intent score of the search intent corresponding to the search result item's search result list; selecting, by the computing device, one or more top search result items using the generated candidate scores, each of the one or more top search result items having a better candidate score than unselected search result items; and generating, by the computing device, a search results presentation for display at the user's client device, the search results presentation comprising a presentation of the one or more top search result items.

In accordance with one or more embodiments a system is provided, which system comprises at least one computing device, each computing device comprising a processor and a storage medium for tangibly storing thereon program logic for execution by the processor, the stored program logic comprising receiving logic executed by the processor for receiving an electronic messaging search request to search at least one electronic data store comprising different types of items including a message item type, the search request comprising a user's search query; identifying logic executed by the processor for identifying a plurality of search intents for the search query using the search query, each search intent corresponding to an item type; generating logic executed by the processor for generating a plurality of search result lists by performing a plurality of searches of the at least one electronic data store, each search of the plurality of searches generating a search result list of items having an object type corresponding to a search intent of the plurality of search intents and identifying a relevance score for each search result item in the search intent's search result list, the search result item's relevance score indicating the search result item's relevance to the search query; generating logic executed by the processor for generating, for each search intent of the plurality of search intents, a search intent score; generating logic executed by the processor for generating a plurality of candidate scores, each candidate score corresponding to a search result item included in a search result list of the plurality of search result lists, each search result item's score is generated using the search result item's relevance score and the search intent score of the search intent corresponding to the search result item's search result list; selecting logic executed by the processor for selecting one or more top search result items using the generated candidate scores, each of the one or more top search result items having a better candidate score than unselected search result items; and generating logic executed by the processor for generating a search results presentation for display at the user's client device, the search results presentation comprising a presentation of the one or more top search result items.

In accordance with yet another aspect of the disclosure, a computer readable non-transitory storage medium is provided, the medium for tangibly storing thereon computer readable instructions that when executed cause at least one processor to receive an electronic messaging search request to search at least one electronic data store comprising different types of items including a message item type, the search request comprising a user's search query; identify a plurality of search intents for the search query using the search query, each search intent corresponding to an item type; generate a plurality of search result lists by performing a plurality of searches of the at least one electronic data store, each search of the plurality of searches generating a search result list of items having an object type corresponding to a search intent of the plurality of search intents and identifying a relevance score for each search result item in the search intent's search result list, the search result item's relevance score indicating the search result item's relevance to the search query; generate, for each search intent of the plurality of search intents, a search intent score; generate a plurality of candidate scores, each candidate score corresponding to a search result item included in a search result list of the plurality of search result lists, each search result item's score is generated using the search result item's relevance score and the search intent score of the search intent corresponding to the search result item's search result list; select one or more top search result items using the generated candidate scores, each of the one or more top search result items having a better candidate score than unselected search result items; and generate a search results presentation for display at the user's client device, the search results presentation comprising a presentation of the one or more top search result items.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1, which comprises FIGS. 1A and 1B, provides a process flow example for use in accordance with one or more embodiments of the present disclosure.

FIG. 2, which comprises FIGS. 2A, 2B and 2C, provides an example for use in accordance with one or more embodiments of the present disclosure.

FIG. 3 provides a presentation example in accordance with one or more embodiments of the present disclosure.

FIG. 4 provides a mobile device interface example in accordance with one or more embodiments of the present disclosure.

FIG. 5 provides a browser interface example in accordance with one or more embodiments of the present disclosure.

DETAILED DESCRIPTION

Figure 1A:
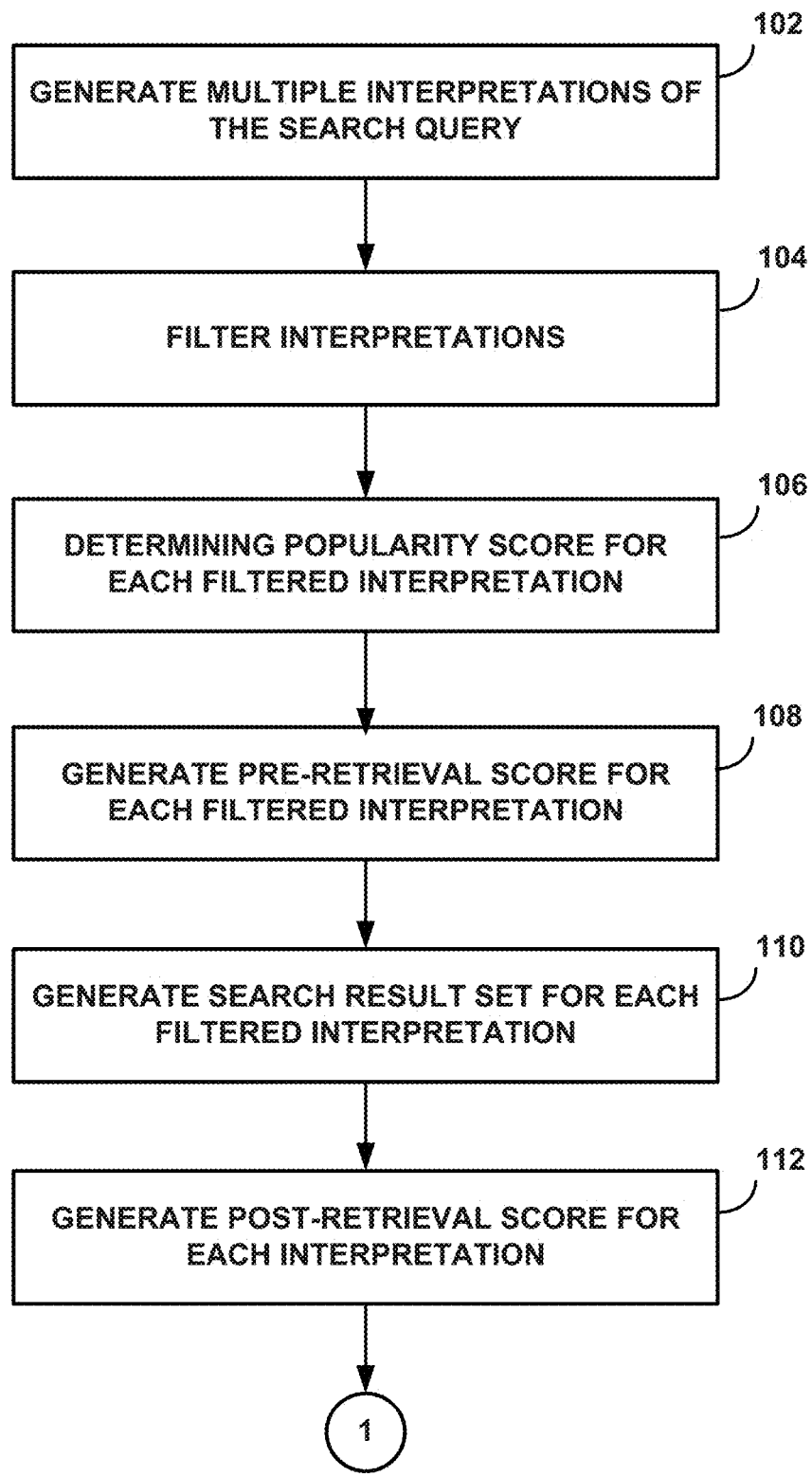

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In general, the present disclosure includes an electronic messaging search system, method and architecture. Embodiments of the present disclosure are discussed in connection with electronic mail messages, or email; however, it should be understood that embodiments of the present disclosure may be used with other types of messages, such as short message, a text message, etc.

In accordance with one or more embodiments, in response to a query, e.g., a text query, received from a user via the user's computing device, embodiments of the present disclosure identify at least one search result item, at least one hero or top search result item(s), most relevant to the user as well as to the query. In accordance with at least one such embodiment, the identified search result item(s) may be emphasized in a search results presentation. By way of a non-limiting example, the identified search result item(s) may be emphasized in a separate presentation area of a search results presentation. By way of a further non-limiting example, the separate presentation area may be located above one or more other presentation areas, which may be used to present search results other than the one or more top search result item(s) identified for the search query request. As yet a further non-limiting example, the search results presentation may comprise a first presentation area presenting the top search result item(s) apart from, such as and without limitation above, a second presentation area presenting search result items other than the top search result item(s), the other search result items in the second presentation area may be presented in chronological order, e.g., reverse chronological order.

Given a user query, embodiments of the present disclosure may be used to search one or more message data stores for items such as and without limitation messages, contacts, photos, documents, such as and without limitation papers, presentations, etc., business entities, personal information extracted from messages, such as and without limitation purchase orders, shipments, reservations, travel itineraries, etc. Embodiments of the present disclosure may access several sources of data, which may be indexed for use in accordance with one or more embodiments, such as and without limitation a personal mail search index, contacts, or business entity, index, attachments index, extracted data index, etc. The one or more data sources and/or indexes of data of such data sources, may be referred to herein as one or more electronic data stores.

In accordance with one or more embodiments, each item has a corresponding item type. By way of a non-limiting example, a message is an item having a message type. Other examples of an item type include without limitation contact, photo, document, business entity, personal information etc. In accordance with one or more embodiments, a search query may have multiple possible interpretations, or intents, each of which may have a corresponding item type.

Figure 1B:
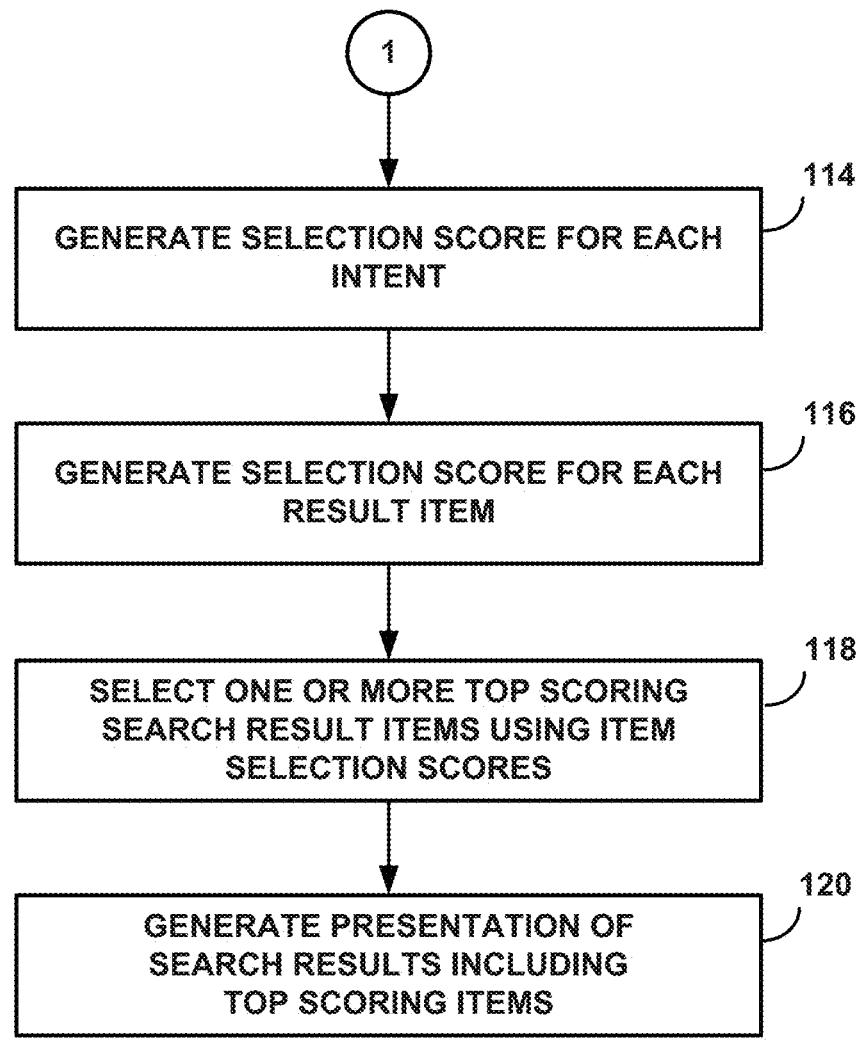

FIG. 1, which comprises FIGS. 1A and 1B, provides a process flow example for use in accordance with one or more embodiments of the present disclosure. The process flow of FIG. 1 may be executed by one or more computing devices, each of which may comprise at least one processor and a storage medium for tangibly storing thereon program logic for execution by the at least one processor. By way of a non-limiting example, the one or more computing devices may comprise one or more server computing devices, one or more client computing devices, or some combination of server and client computing devices.

Figure 2A:
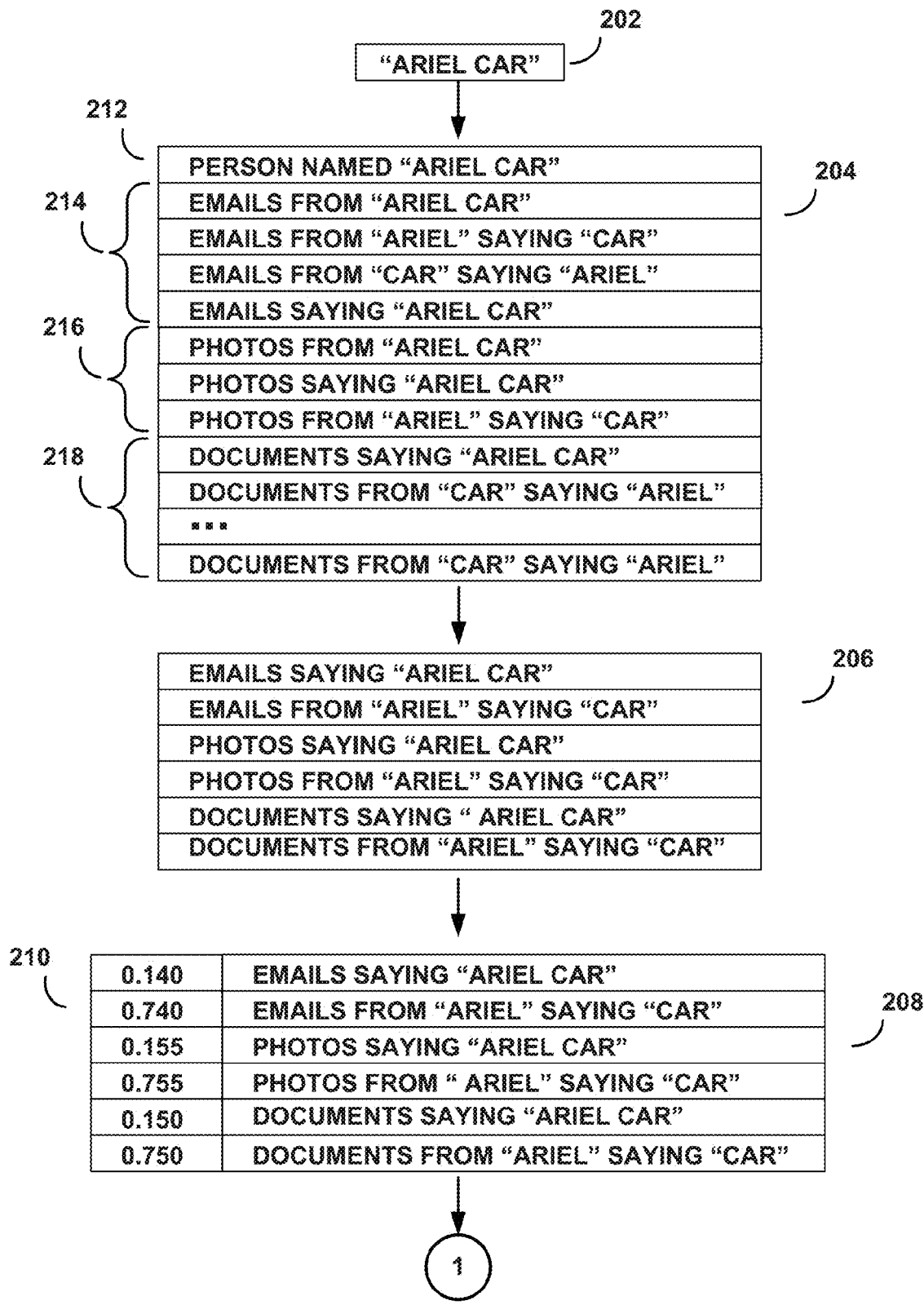
Figure 2B:
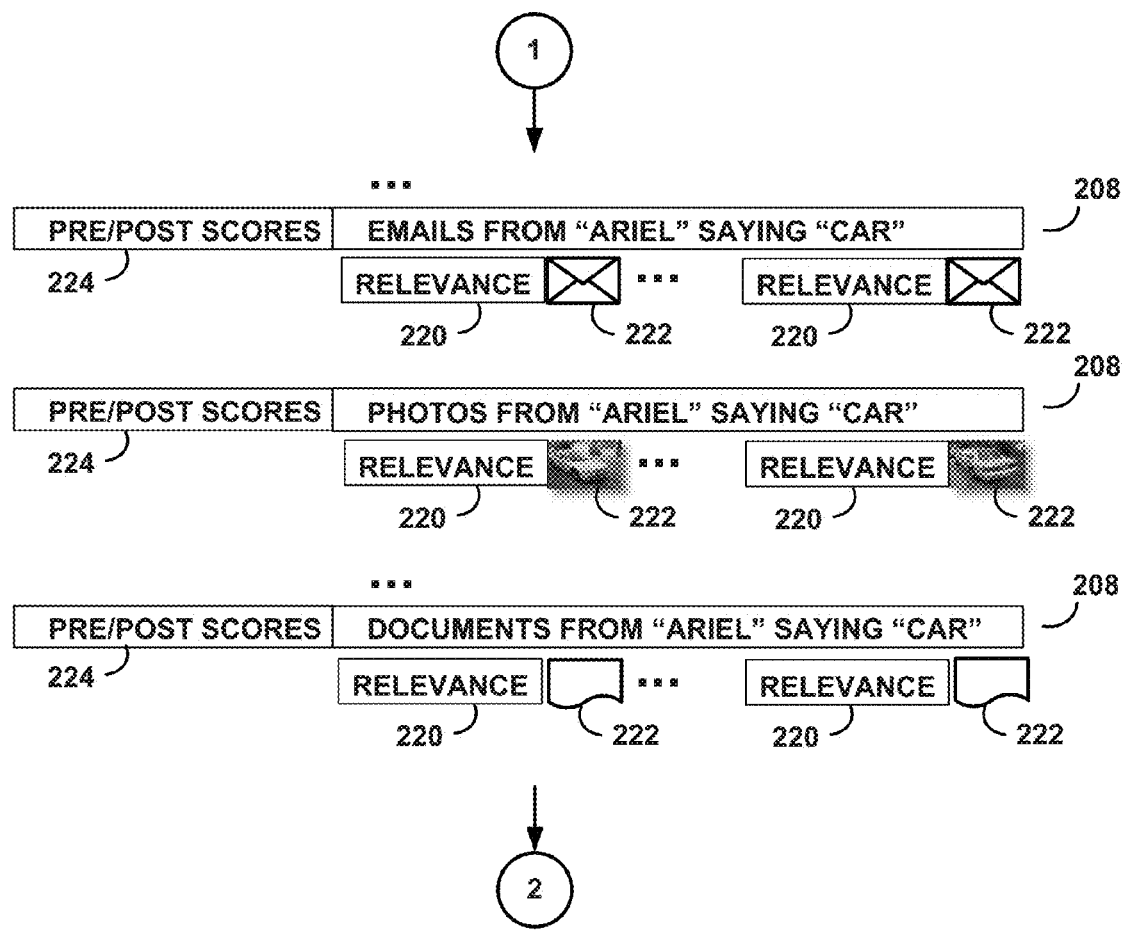
Figure 2C:
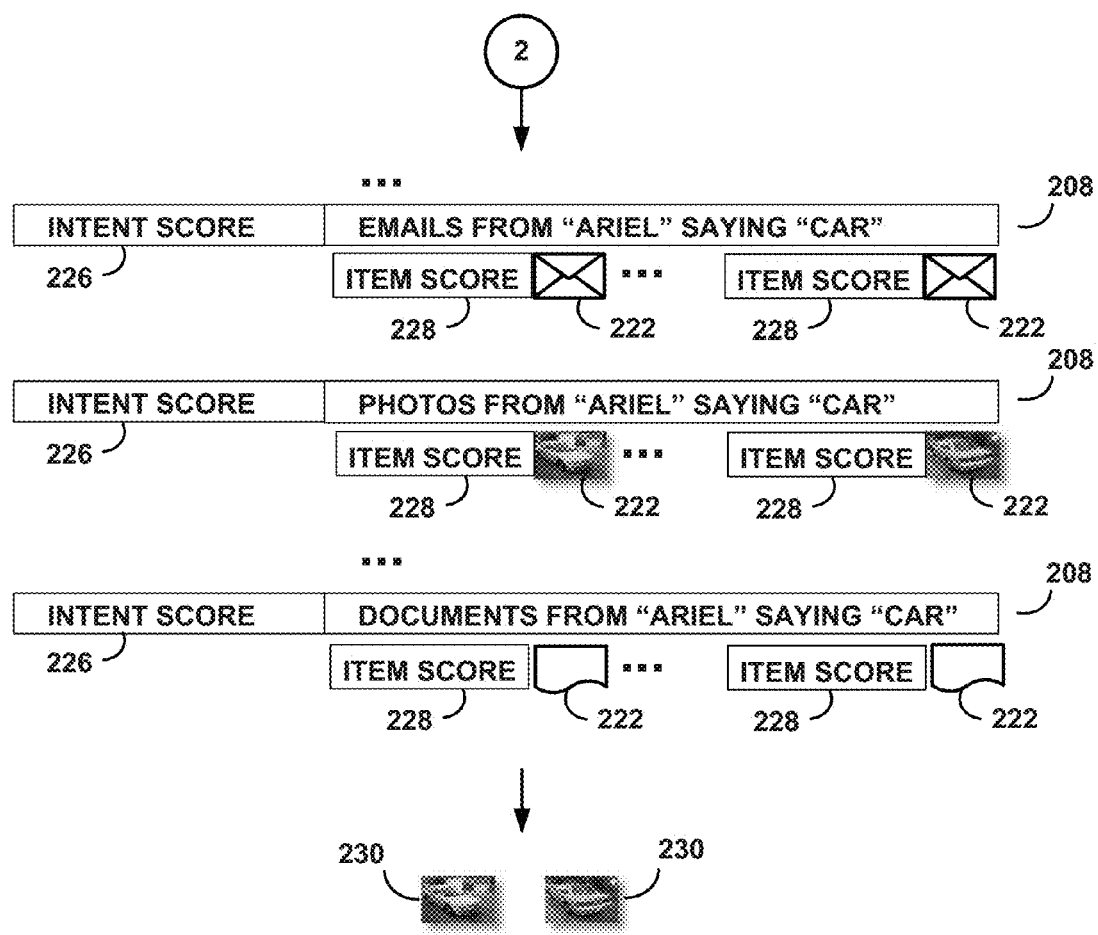

At step 102, a received search query is parsed and analyzed to generate a number of possible interpretations, or intents, of the search query. Query analysis performed at step 102 may be used to identify possible intended types of items that the user desires to access using the search query. In accordance with one or more embodiments, natural language processing and item type recognition may be used to interpret the search query and generate a number of possible interpretations, or intents. Reference is made to FIG. 2, which comprises FIGS. 2A, 2B and 2C, and which provides an example for use in accordance with one or more embodiments of the present disclosure.

Search query 202 is received, and comprises the phrase "ariel car". In accordance with one or more embodiments, multiple, different interpretations of the phrase received as a search query are generated. Each of the interpretations 204 may represent an intent of the user in submitting the search request. Interpretations 204 of the "ariel car" are shown in FIG. 2A. In the example interpretations 204 shown in FIG. 2A, different types of items are represented, such as contacts 212, emails 214, photos 216 and documents 218. Using the non-limiting example shown in FIG. 2A, the phrase "ariel car" might be interpreted as a person's name, in which case the intent of the search query may be to search contacts to find the person named "Ariel Car". Another possible intent of the search query interpreted to be a person's name is to search for emails from, or to, the person named "Ariel Car". The words in the phrase "ariel car" may be interpreted to be referring to a person, "Ariel", and a "car", or vice versa, which may result in different interpretations, and intents, of the search query, as shown in the example of FIG. 2A. In the example shown in FIG. 2A, "saying" may be used to further refine the search, such that the word "saying" may mean "including" or "associated with", for example. By way of a non-limiting example, a search may include a search of the body of an email, metadata associated with a photo, the contents of a document, etc. for the word(s) "ariel" and/or "car".

Referring again to FIG. 1A, and step 104, the possible interpretations, and corresponding intents, may be filtered using user information, such as and without limitation the user's personal mail information. In accordance with one or more embodiments, the possible interpretations of the search query may be filtered to identify a number of selected interpretations of the search query using information from one or more data stores associated with the user. Each selected interpretations may correspond to a search intent and an item type.

By way of a non-limiting example, the user's contacts may be used to filter the possible interpretations, such as and without limitation the user's contacts may be used to determine whether or not the user knows a person, or other entity, with the name, title, description, etc. of "ariel" and/or "car". In the example shown in FIG. 2A, the user's contacts may include a person named "Ariel", and the possible interpretations 204 may be filtered to remove possible interpretations involving a person, or other entity, named "Ariel Car".

Filtering performed at step 104 of FIG. 1A may yield filtered interpretations 206 of FIG. 2A. In accordance with one or more embodiments, each filtered interpretation corresponds to a search intent of the search query by the user to locate item types associated with each of the potential intents. By way of a non-limiting example, the item types associated with the filtered interpretations include emails, photos and documents. By way of some further non-limiting examples, possible intents of the "ariel car" search query may include without limitation locating emails that include, in the header, body, etc., the phrase "ariel car", emails from "Ariel" that include the word "car", photos that have associated information, e.g., metadata, including the phrase "ariel car", photos associated with the word "car" and attached to emails received from "Ariel", documents that includes the phrase "ariel car", documents including the word "car" and attached to emails received from "Ariel", etc. Other non-limiting examples of intents include without limitation an intent to search for an order, receipt, travel reservation, calendaring data, appointments, engagement etc. in messaging content. It should be apparent that examples of intents provided herein are not meant to be exhaustive and that any intent may be considered in embodiments of the present disclosure.

At step 106 of FIG. 1A, a prior over the intent, which may be represented as P(L) may be associated with each intent, where L represents the interpretation, or intent. The value of P(L) may be determined using a popularity or frequency of occurrence of the intent. The value of P(L) for a given intent, L, may be a general value, which is determined for a plurality of users, e.g., a value determined using a frequency of occurrence of the intent for the plurality of users, or a value personalized for a given user, e.g., a value determined using a frequency of occurrence of the intent for the given user. In accordance with one or more embodiments, P(L) may be a value from in a range of 0 to 1, and a larger value associated with an interpretation, or intent, may represent a higher likelihood or probability for the interpretation, or intent.

At step 108 of FIG. 1A, a pre-retrieval score is generated for each filtered intent, or interpretation, e.g., filtered interpretations, or intents, 206 of FIG. 2A. In accordance with one or more embodiments, a search intent's pre-retrieval score may represent a likelihood that the search intent is an accurate reflection of the actual search intent of the user, or the search query's actual intent. In accordance with one or more embodiments, the pre-retrieval score of a search query intent may be determined prior to retrieving a corresponding list of search results and may represent a prediction of how well the intent is relevant to the query. In the example shown in FIG. 2A, intents 208, which correspond to the filtered intents 206, each has an associated pre-retrieval score 210. In the example shown in FIG. 2A, the score 210 may be a value in a range of 0 to 1, and a higher value may indicate a higher likelihood that the intent is relevant to the query, and/or the possible intent represents the actual intent of the query.

In accordance with one or more embodiments, a search intent's pre-retrieval score may be generated using a model trained using a machine learning approach and training data collected from past experiences. For example and without limitation, the training data may comprise a set of queries, results and user interactions, e.g., clicking behavior, with the results. The training data may represent experiences of a number of users and may be used to generate a general model for use with a number of users. Alternatively, the training data may represent the experiences of a given user and may be used to generate a personalized model for use with the given user; in which case, a personalized model may be used for each user. As yet another alternative, a generalized model may be used for a subset of the users and a personalized model may be used for another subset of users. As a further alternative, both a generalized model and a personalized model may be used for a given user to generate a pre-retrieval score.

At step 110 of FIG. 1A, a search result list may be generated for each filtered interpretation, or intent, e.g., a search result list may be generated for each interpretation/intent 206. In accordance with one or more embodiments, the searches performed at step 110 may comprise a federated search taking into account different types of items, such as messages, contacts, photos, documents, personal information extracted from messages, etc.

By way of a non-limiting example, an email message index may be searched using the search phrase "ariel car" as the search criteria to determine whether any email messages contain the terms "ariel" and "car" and satisfy the search query. Another search of the email message index may be performed to find email messages from "Ariel" and including the word "car". In accordance with one or more embodiments, one or more attachments indexes may be used to index message attachments. In a case that the same attachments index is used for different types of attachments, different searches may be performed on the attachments index to generate a result list comprising photos saying "ariel car", a result list comprising photos from "Ariel" saying "car", a result list comprising documents saying "ariel car" and a result list comprising documents from "Ariel" saying "car". Of course, it should be apparent that different indexes may be used for different types of items, such as and without limitation attachments. In a case that different indexes are used for different types of attachments, a search may be performed on the appropriate type of attachment index to generate a list of search results.

At step 112 of FIG. 1A, a post-retrieval score may be generated for each interpretation, or intent, e.g., for each interpretation, or intent, 206. In accordance with one or more embodiments, a post-retrieval score, which may also be referred to as a query performance prediction (QPP), may be an estimate of the quality of the results provided in connection each query intent/interpretation, and may indicate how well the corresponding list of search results satisfy the query. Factors that may be used in generating the post-retrieval score may include without limitation the number of items in the search result list, whether or not the result list is null, or empty, the recency, e.g., an aggregate recency, of the search result list items, etc.

In accordance with one or more embodiments, the post-retrieval score for a search result list, or search result list, may be an estimate of the quality of the results that the search result list provides. Such an estimation may identify the cases in which the top results of a search result list are expected to be high quality, as well as cases where the top results of a search result list are of low quality and can be ignored, the latter of which may be considered to be missing content cases.

In accordance with one or more embodiments, a post-retrieval score for a search result list can be based on a normalized query commitment (NQD) estimate generated using a score distribution analysis based on a standard deviation of a set of top-retrieved scores using, by way of a non-limiting example, an approach such as that described in the articled by Shtok, A, et al. *Predicting Query Performance By Query-Drift Estimation*, ICTIR, pp. 305-312, 2009. The distribution of the scores of the items that have been retrieved may be used in determining how well the list of search results satisfies the search query.

With reference to FIG. 2B, each interpretation, or intent, 208 may have corresponding scores 224, which may comprise both pre-retrieval scores and post-retrieval scores such as those generated at steps 106, 108 and 112 of FIG. 1A, and a list of search results comprising search result items 222, and each search result item may have a score 220. In accordance with one or more embodiments, score 220 may be a relevance score representing a relevance of the search result item to the search query. Score 220 may be returned by the search engine performing a search of one or more data stores, which may comprise one or more indexes, for items of the type associated with the interpretation, or intent, using the search query. In accordance with one or more embodiments, score 220 may be determined as follows:

score(q, d)=staticBoost(d)·coord(q, d)·Σ(tf(t|f, d)·idf(t)·fiedlBoost(f)), where q represents a search query, d represents a search result item, such as a document, message, photo, etc., and t represents a term of the search query. In the above formula, coord(q, d) may represent a number of query terms in the search result item, tf(t|f, d) may represent a frequency of a term, t, in subject field f, idf(t) may be determined to be the total number of documents divided by the number of documents containing the term, t, and fiedlBoost(f) may represent the importance of each subject field, f.

In accordance with one or more embodiments, staticBoost (d) may be determined as follows:

staticBoost(*d*)=docAgeNorm(*d*)·docLengthNorm(*d*), where docAgeNorm(d) may be based on a date of the search result item, d, and may use an exponential time-decay function, and may consider a more recent item to be considered better than a less recent item, and docLengthNorm (d) may be based on a length of the search result item, d, where a shorter item is considered to be better than a longer item.

The following provides another example of generating a score for ranking of contacts. The following example assumes that a contact name is "David" and a query of the form "messages with * to David", where "*" may represent one or more search terms, for example. The query may be interpreted to be a request for messages containing "***" sent to David. The rank, P(David), may be determined as follows:

*P*(David)=[Number of Emails to/from David)/(Total Number of Emails to/from All Contacts)]* [(Number of Outbound Emails To David)/(Total Number Of Emails to/from David)].

As yet another example, assume that the query is in the form of "messages with * from David, which may be interpreted to be a request for messages containing "*" received from David. The rank, P(David), may be determined as follows:

*P*(David)=[Number of Emails to/from David)/(Total Number of Emails to/from All Contacts)]* [(Number of Inbound Emails From David)/(Total Number Of Emails to/from David)].

In the above examples, each of the counts of the number of emails may be time-decayed by an amount, such as and without limitation 0.92, each increment of time, such as and without limitation each week. Thus, a message to David today may count as one while a message to David received last week may count for 0.92 and a message to David two weeks ago may count as 0.92*0.92, or 0.8462.

In accordance with one or more embodiments, each interpretation, or intent, may have an associated set of scores 224. Scores 224 may comprise P(L) determined at step 106 of FIG. 1A, a pre-retrieval score determined at step 108 of FIG. 1A, which pre-retrieval score may be represented as P(q|L), and a post-retrieval score determined at step 112 of FIG. 1A, which post-retrieval score may be represented as $P(R_L|q, L)$, where $R_L$ represents a search result list.

Referring to FIG. 1B, a selection score may be determined for each interpretation, or intent, 208 at step 114. In the example shown in FIG. 2C, intent score 226 is associated with each interpretation, or intent, 208. In accordance with one or more embodiments, scores 224 may be used to generate intent score 226. In accordance with one or more embodiments, intent score 226 may be determined as follows:

$$P(R_L,q,L)=P(R_L|q,L)*P(q|L)*P(L)$$

At step 116 of FIG. 1B, an item score may be generated for each result item of each search result list. In the example of FIG. 2C, each search result item 222 has an associated item score 228. In accordance with one or more embodiments, a search result item's item score 228 may be a combination of the search result item's relevance score 220 and the score 226 of the intent for which the search result item is generated. In accordance with one or more embodiments, an item score 228, may be determined for a result item 222 by combining the relevance score 220, which is represented in the below formula as S(i), for an item 222, which item is represented in the below formula as i, in a search result list, $R_L$, and the intent score 226, which is represented below as $P(R_L,q,L)$, associated with the search result list, $R_L$, as follows:

$$\text{Item score}(i)=P(R_L,q,L)*(S(i)^x),$$

where x may be a weight for the item i versus the list. In accordance with one or more embodiments, the item scores 228, each of which is represented in the above formula as Item score(i), may be normalized in all of the lists so as to be in the same range, e.g., such as and without limitation a range of 0 to 1.

Referring again to FIG. 1B, one or more search result items 222 may be selected based on their item scores 228 relative to other result items' item scores 228. In accordance with one or more embodiments, a number of search result items 222 may be selected whose item score 228 satisfies a threshold value. In accordance with one or more embodiments a threshold number of items 222 having the highest item scores 228 relative to others ones of the items 222 may be selected. In accordance with one or more embodiments, the search result items in the search result lists generated at step 110 may be combined and ranked using their respective item score 228, and one or more items 222 may be selected based on their item score(s) 228 relative to the item scores 228 of other unselected items 222. In the example shown in FIG. 2C, items 230 are selected from the search result items 222 included in the search result lists generated for each interpretation 208 using their respective item scores 228. In accordance with one or more embodiments, each item score 228 can be determined by combining the relevance score 220 for the item 222 and the intent score 226 associated with the search result list, $R_L$, containing the item 222. In accordance with one or more such embodiments, each of items 230 may have an item score 228 that satisfies a threshold score, for example, and/or each of items 230 may have an item score 228 that is greater than the item scores 228 of other unselected search result items 222.

At step 120 a presentation of search results may be generated. In accordance with one or more embodiments, the presentation may include the top scoring item(s) identified at step 118 and may include other search result items. In a case that other search result items are included in the presentation, the top scoring item(s) may be presented separate from the other search result items in the presentation. In accordance with one or more embodiments, the top scoring item(s) can be presented as hero results that are separated from the presentation of other non-hero results, which non-hero results can appear below the hero results. The top scoring items, e.g., hero results, can be of various types. In the example shown in FIG. 2C, items 230 are each of the type photo; however, it should be apparent that items of any type may be selected to be the top scoring item(s) 230 and that items 230 may be of different types.

Figure 3:
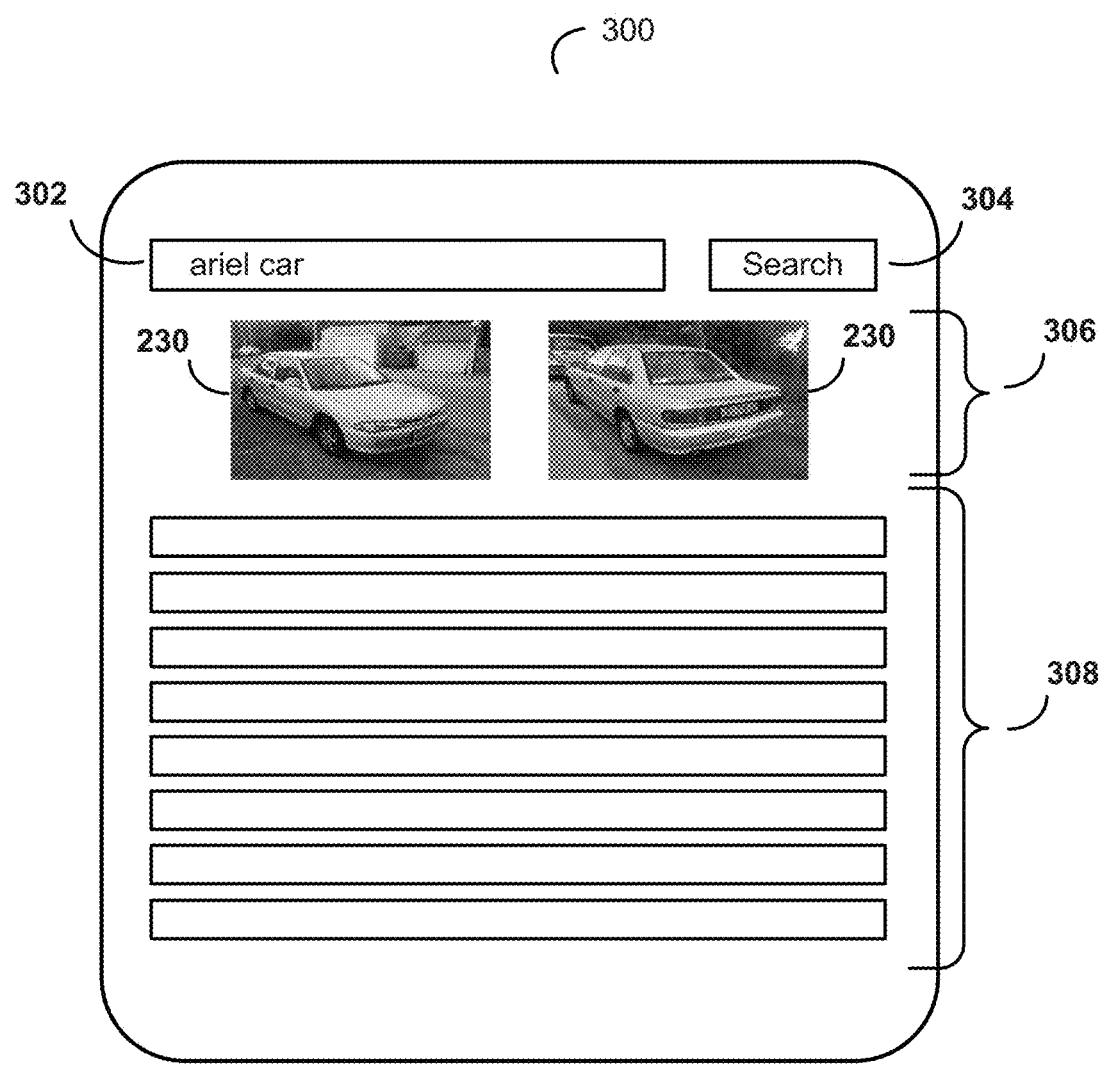

FIG. 3 provides a presentation example in accordance with one or more embodiments of the present disclosure. Presentation 300 comprises presentation areas 306 and 308. A search input field 302 and search button 304 may be used to receive a search query input from a user via the user's client computing device. Presentation area 306 may be used to present hero results comprising one or more top scoring search result items, such as and without limitation result items 230 of FIG. 2C. Presentation area 306 appears separate from the presentation area 308. In the example shown in FIG. 3, presentation area 308 used to present the top scoring search result items, the hero results, appears above presentation area 308, which may be used to display one or more search result items other than the search result item(s) selected as the top search result item(s). By way of a non-limiting example, presentation area 308 may be used to display email messages not selected as top search result items; the unselected email messages may be sorted in chronological order in presentation area 308.

Presentation area 306 may be used to present any type of item, including messages, photos, attachments, etc. While search results items 230 in the example of FIG. 3 are the same type of item, it should be apparent that top search results items may be different types of items. Furthermore, presentation area 308 may be used to display any type of unselected search result item, and may present different types of search result items.

Figure 4:
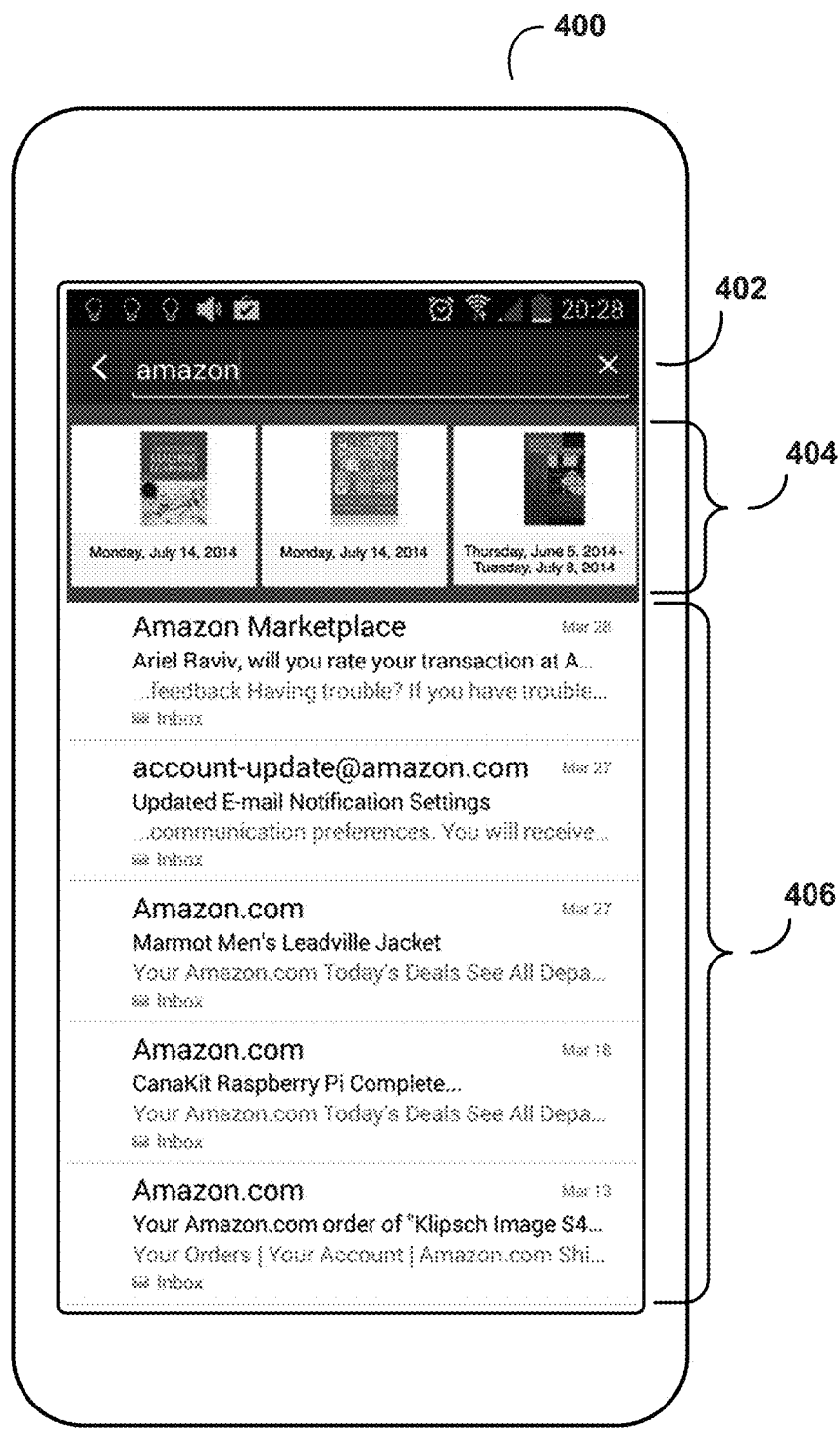

FIG. 4 provides a mobile device interface example in accordance with one or more embodiments of the present disclosure. In the example shown in FIG. 4, device 400, which may be a mobile telephone, personal data assistant (PDA) etc., displays a user interface, which may be received from a server computer, for example. The user interface may be received by a browser application, or other application, executing on the mobile device from a server computing device, and displayed on the mobile device by the application executed on the mobile device. The user interface comprises a search input area 402 and presentation areas 404 and 406. Presentation area 404 displays three search result items selected as top search result items. Presentation area 406 displays email messages, which are not selected as top search result items and are listed in chronological order. The search result items provided in presentation areas 404 and 406 are in response to the search query entered in input area 402. In accordance with one or more embodiments, the number of top search result items to be selected may be determined based on the user's device. In the example shown in FIG. 4, mobile device 400 has a limited display space, which may suggest that the fewer number of top search result items be selected. Of course, more than three items may be included in presentation area 404 using a scrolling feature allowing the user to scroll horizontally using a horizontal swiping gesture, for example.

Figure 5:
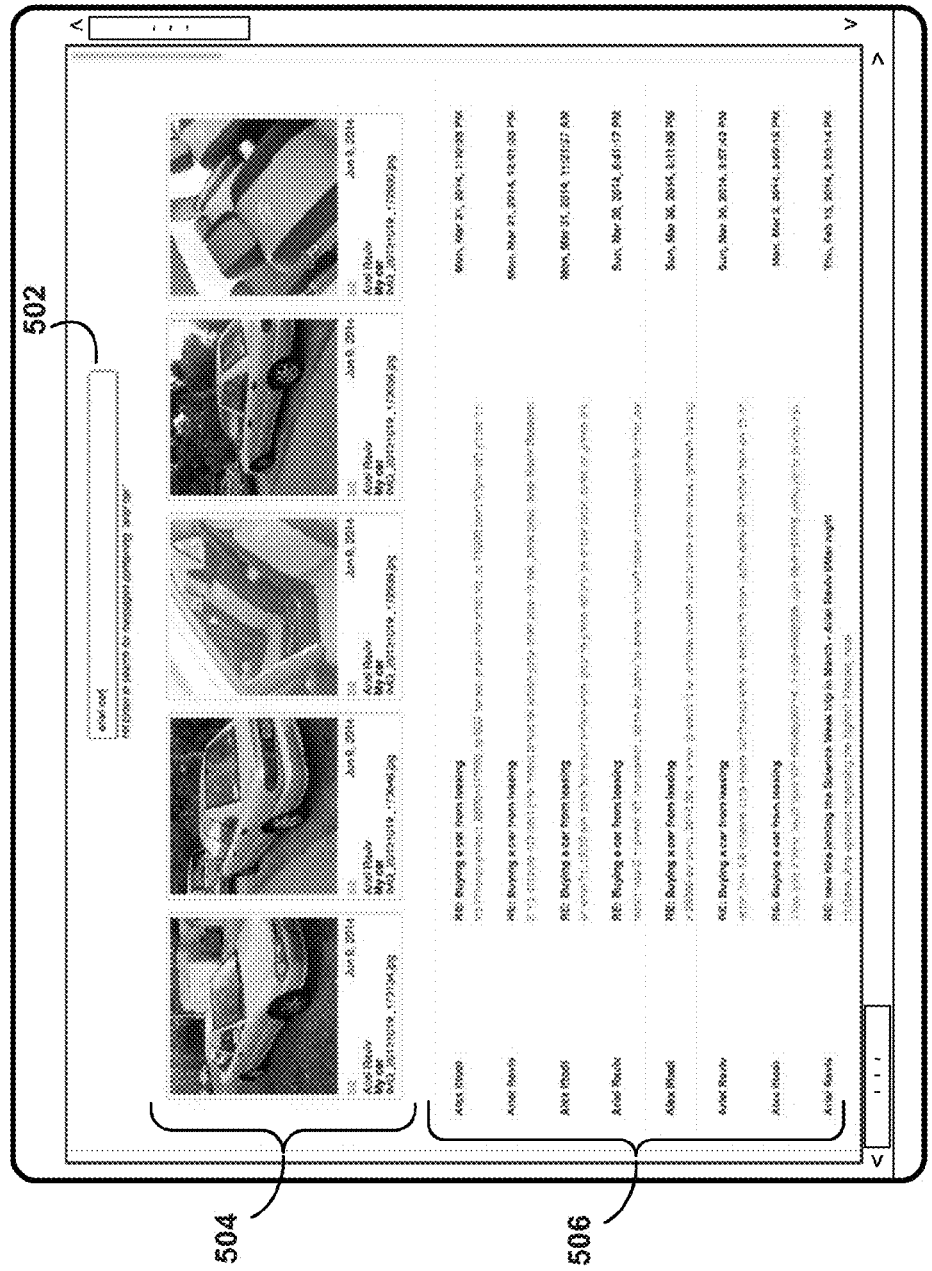

FIG. 5 provides a browser interface example in accordance with one or more embodiments of the present disclosure. In the example shown in FIG. 5, user interface 500 might be displayed on a client device, such as a desktop computer, mobile phone, PDA, tablet, etc., using a client application, such as a browser or other application. The user interface 500 may be received by the client application from a server computer, for example. The user interface 500 comprises a search input area 502 and presentation areas 504 and 506. Presentation area 504 includes a number of search result items selected as the top search result items. Presentation area 506 includes email messages listed in chronological order. The search result items provided in presentation areas 504 and 506 are in response to the search query entered in input area 502. As with the user interface 400, a scrolling capability may be provided to scroll through the items in presentation areas 504 and 506. Page scrolling controls are shown in the example of FIG. 5, which may receive input via a mouse, stylus, touch-sensitive display, etc. While not shown, different scrolling controls may be provided to allow for independent scrolling of presentation areas 504 and 506. By way of a non-limiting example, a horizontal scrolling capability may be provided in connection with presentation area 504 to receive input from the user and allowing the user to scroll horizontally using a horizontal swiping gesture, for example.

Figure 6:
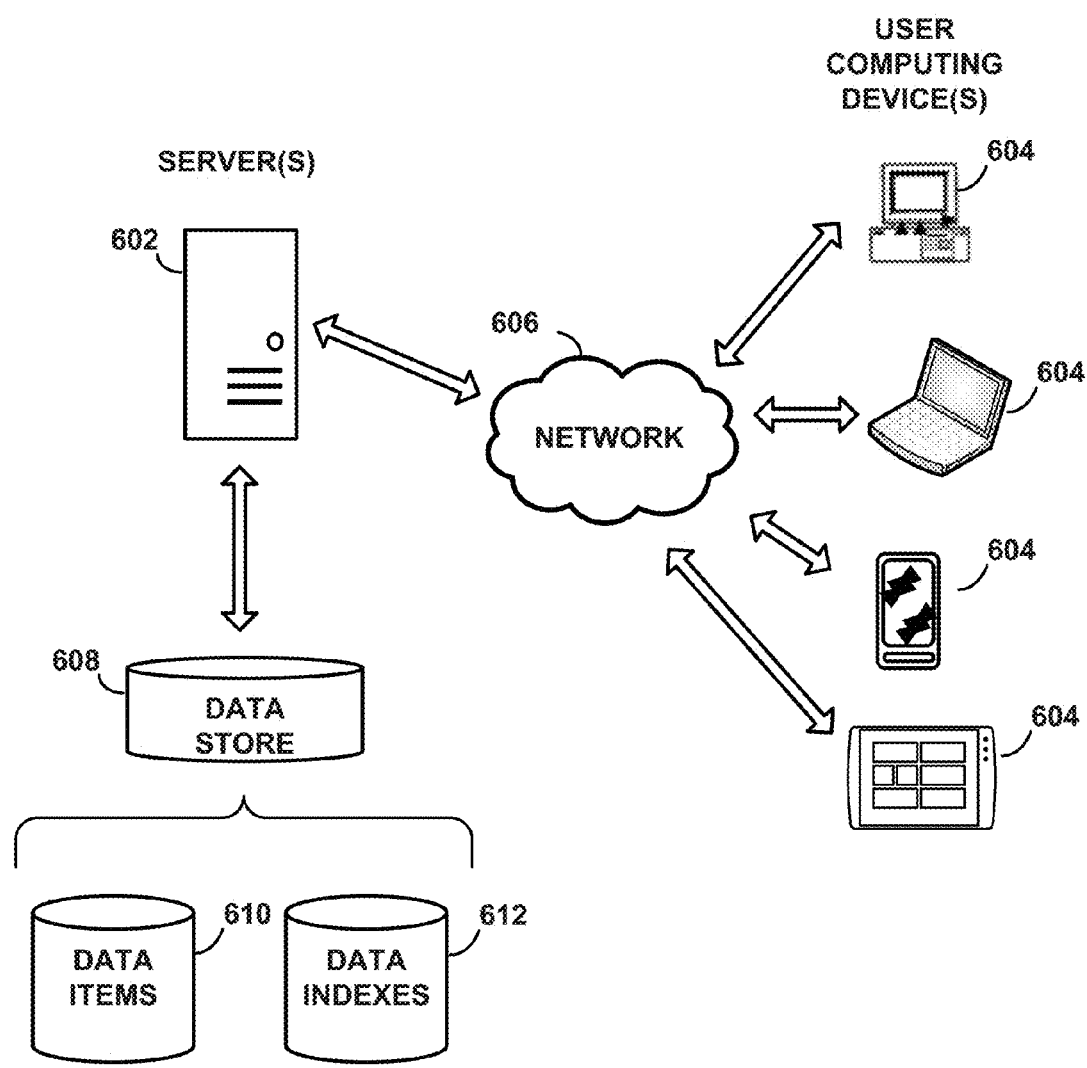
FIG. 6 illustrates some components that can be used in connection with one or more embodiments of the present disclosure.

FIG. 6 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 602 can be configured to execute program code, instructions, etc. to provide functionality in accordance with one or more embodiments of the present disclosure.

Computing device 602 can serve content to user computing devices 604 using a browser application via a network 606. Data store 608 can be used to store program code to configure a server 602 to functionality in accordance with one or more embodiments of the present disclosure. In accordance with one or more embodiments, data store 608 may comprise one or more data stores 610 storing data items, such as email messages, contacts, photos, documents, such as and without limitation papers, presentations, etc., business entities, personal information extracted from messages, such as and without limitation purchase orders, shipments, reservations, travel itineraries, etc. Data store 608 may further comprise data indexes 612 comprising indexes of some or all of the data items 610. By way of a non-limiting example, data items of each type may have a corresponding index 612, which may be searched using a user's search query to generate a search result list.

The user computing device 604, user device, may be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 602 and the user computing device 604 can include one or more processors, memory, a removable media reader, network interface, display and interface, and one or more input devices, e.g., keyboard, keypad, mouse, etc. and input device interface, for example. One skilled in the art will recognize that server 602 and user computing device 604 may be configured in many different ways and implemented using many different combinations of hardware, software, or firmware.

In accordance with one or more embodiments, a computing device 602 can make a user interface available to a user computing device 604 via the network 606. The user interface made available to the user computing device 604 can include content items, or identifiers (e.g., URLs) selected for the user interface in accordance with one or more embodiments of the present invention. In accordance with one or more embodiments, computing device 602 makes a user interface available to a user computing device 604 by communicating a definition of the user interface to the user computing device 604 via the network 606. The user interface definition can be specified using any of a number of languages, including without limitation a markup language such as Hypertext Markup Language, scripts, applets and the like. The user interface definition can be processed by an application executing on the user computing device 604, such as a browser application, to output the user interface on a display coupled, e.g., a display directly or indirectly connected, to the user computing device 604.

In an embodiment the network 606 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 6. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 7:
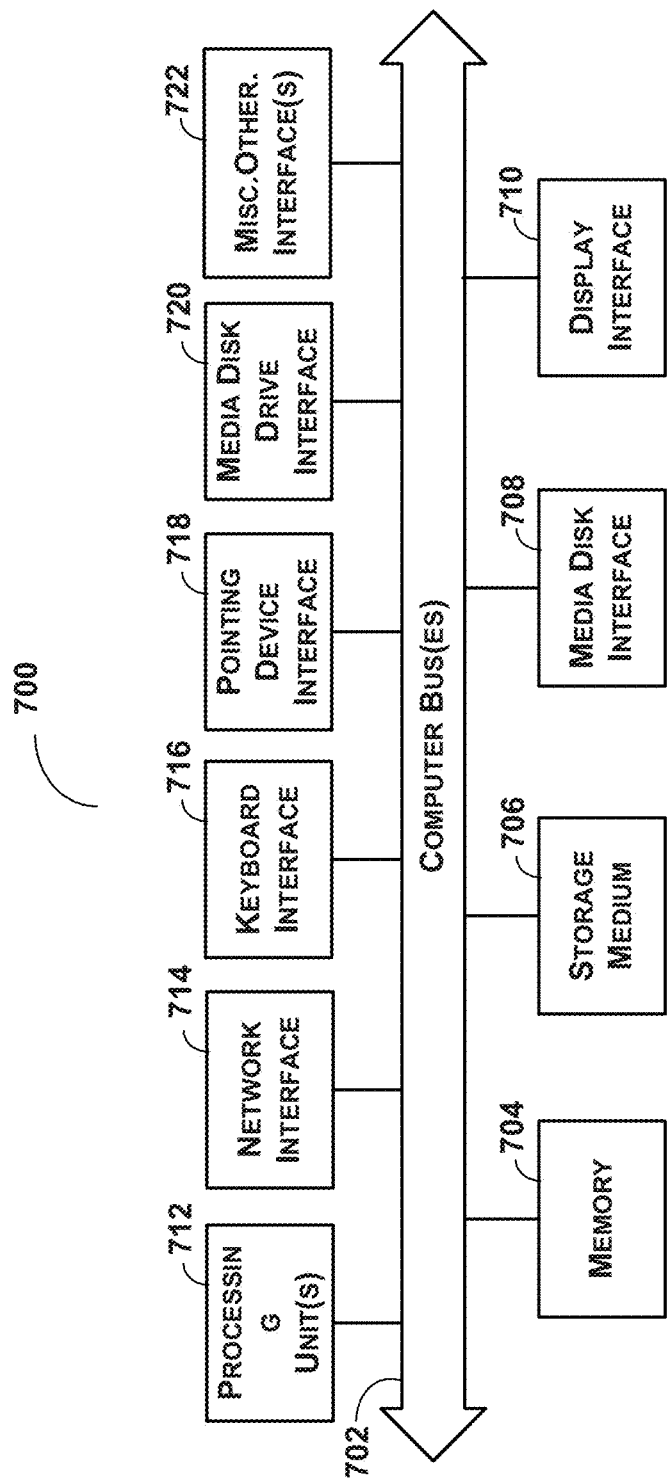
FIG. 7 is a detailed block diagram illustrating an internal architecture of a computing device in accordance with one or more embodiments of the present disclosure.

FIG. 7 is a detailed block diagram illustrating an internal architecture of a computing device, e.g., a computing device such as server 602 or user computing device 604, in accordance with one or more embodiments of the present disclosure. As shown in FIG. 7, internal architecture 700 includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), etc., media disk drive interface 720 as an interface for a drive that can read and/or write to media including removable media such as floppy, CD-ROM, DVD, etc. media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces, a universal serial bus (USB) interface, and the like.

Memory 704 interfaces with computer bus 702 so as to provide information stored in memory 704 to CPU 712 during execution of software programs such as an operating system, application programs, device drivers, and software modules that comprise program code, and/or computer-executable process steps, incorporating functionality described herein, e.g., one or more of process flows described herein. CPU 712 first loads computer-executable process steps from storage, e.g., memory 704, computer-readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
   receiving, by a computing device, an electronic messaging search request to search at least one electronic data store comprising different types of items including a message item type, the search request comprising a user's search query;
   identifying, by the computing device, a plurality of search intents for the search query using the search query, each search intent corresponding to an item type;
   generating, by the computing device, a plurality of search result lists by performing a plurality of searches of the at least one electronic data store, each search of the plurality of searches generating a search result list of items having the item type corresponding to a search intent of the plurality of search intents and identifying a relevance score for each search result item in the search intent's search result list, the search result item's relevance score indicating the search result item's relevance to the search query;
   generating, by the computing device and for each search intent of the plurality of search intents, a search intent score using the search intent's search result list;
   generating, by the computing device, a plurality of candidate scores, each candidate score corresponding to a search result item included in a search result list of the plurality of search result lists, each search result item's candidate score is generated using the search result item's relevance score and the search intent score of the search intent corresponding to the search result item's search result list;

selecting, by the computing device, one or more top search result items using the generated candidate scores, each of the one or more top search result items having a better candidate score than unselected search result items; and generating, by the computing device, a search results presentation for display at the user's client device, the search results presentation comprising a presentation of the one or more top search result items.

2. The method of claim 1, the identifying a plurality of search intents further comprising:

identifying a plurality of possible interpretations of the search query; and filtering the plurality of possible interpretations of the search query to identify a plurality of selected interpretations of the search query using information from the at least one electronic messaging data store associated with the user, each selected interpretation corresponding to a search intent of the plurality of search intents.

3. The method of claim 1, generating a search intent score further comprising:

generating, by the computing device and for each search intent of the plurality of search intents, a pre-retrieval score for the search intent, the search intent's pre-retrieval score representing a likelihood that the search intent is an accurate reflection of the search query's actual intent;

generating, by the computing device and for each search intent of the plurality of search intents, a post-retrieval score for the search intent, the search intent's post-retrieval score representing a likelihood that the search intent's search result list satisfies the search query;

generating, by the computing device and for each search intent of the plurality of search intents, a popularity score for the search intent; and generating, by the computing device and for each search intent, the search intent score based on the search intent's pre-retrieval, post-retrieval and popularity scores.

4. The method of claim 3, the search intent's pre-retrieval score is personalized to the user.

5. The method of claim 3, the search intent's pre-retrieval score is generalized across a plurality of users.

6. The method of claim 1, the search results presentation comprising at least first and second presentation areas, the first presentation area is for use in presenting the one or more top search result items and the second presentation area is for use in presenting one or more of the unselected search result items.

7. The method of claim 6, the one or more unselected result items comprising a plurality of electronic messages presented in the second presentation area as a list sorted in chronological order.

8. A system comprising:

at least one computing device, each computing device comprising a processor and a storage medium for tangibly storing thereon program logic for execution by the processor, the stored program logic comprising:

receiving logic executed by the processor for receiving an electronic messaging search request to search at least one electronic data store comprising different types of items including a message item type, the search request comprising a user's search query;

identifying logic executed by the processor for identifying a plurality of search intents for the search query using the search query, each search intent corresponding to an item type;

generating logic executed by the processor for generating a plurality of search result lists by performing a plurality of searches of the at least one electronic data store, each search of the plurality of searches generating a search result list of items having the item type corresponding to a search intent of the plurality of search intents and identifying a relevance score for each search result item in the search intent's search result list, the search result item's relevance score indicating the search result item's relevance to the search query;

generating logic executed by the processor for generating, for each search intent of the plurality of search intents, a search intent score using the search intent's search result list;

generating logic executed by the processor for generating a plurality of candidate scores, each candidate score corresponding to a search result item included in a search result list of the plurality of search result lists, each search result item's candidate score is generated using the search result item's relevance score and the search intent score of the search intent corresponding to the search result item's search result list;

selecting logic executed by the processor for selecting one or more top search result items using the generated candidate scores, each of the one or more top search result items having a better candidate score than unselected search result items; and generating logic executed by the processor for generating a search results presentation for display at the user's client device, the search results presentation comprising a presentation of the one or more top search result items.

9. The system of claim 8, the identifying logic executed by the processor for identifying a plurality of search intents further comprising:

identifying logic executed by the processor for identifying a plurality of possible interpretations of the search query; and filtering logic executed by the processor for filtering the plurality of possible interpretations of the search query to identify a plurality of selected interpretations of the search query using information from the at least one electronic messaging data store associated with the user, each selected interpretation corresponding to a search intent of the plurality of search intents.

10. The system of claim 8, the generating logic executed by the processor for generating a search intent score further comprising:

generating logic executed by the processor for generating, for each search intent of the plurality of search intents, a pre-retrieval score for the search intent, the search intent's pre-retrieval score representing a likelihood that the search intent is an accurate reflection of the search query's actual intent;

generating logic executed by the processor for generating, for each search intent of the plurality of search intents, a post-retrieval score for the search intent, the search intent's post-retrieval score representing a likelihood that the search intent's search result list satisfies the search query;

generating logic executed by the processor for generating, for each search intent of the plurality of search intents, a popularity score for the search intent; and generating logic executed by the processor for generating, for each search intent, the search intent score based on the search intent's pre-retrieval, post-retrieval and popularity scores.

11. The system of claim 10, the search intent's pre-retrieval score is personalized to the user.

12. The system of claim 10, the search intent's pre-retrieval score is generalized across a plurality of users.

13. The system of claim 8, the search results presentation comprising at least first and second presentation areas, the first presentation area is for use in presenting the one or more top search result items and the second presentation area is for use in presenting one or more of the unselected search result items.

14. The system of claim 13, the one or more unselected result items comprising a plurality of electronic messages presented in the second presentation area as a list sorted in chronological order.

15. A computer readable non-transitory storage medium for tangibly storing thereon computer readable instructions that when executed cause at least one processor to:
receive an electronic messaging search request to search at least one electronic data store comprising different types of items including a message item type, the search request comprising a user's search query;
identify a plurality of search intents for the search query using the search query, each search intent corresponding to an item type;
generate a plurality of search result lists by performing a plurality of searches of the at least one electronic data store, each search of the plurality of searches generating a search result list of items having the item type corresponding to a search intent of the plurality of search intents and identifying a relevance score for each search result item in the search intent's search result list, the search result item's relevance score indicating the search result item's relevance to the search query;
generate, for each search intent of the plurality of search intents, a search intent score using the search intent's search result list;
generate a plurality of candidate scores, each candidate score corresponding to a search result item included in a search result list of the plurality of search result lists, each search result item's candidate score is generated using the search result item's relevance score and the search intent score of the search intent corresponding to the search result item's search result list;
select one or more top search result items using the generated candidate scores, each of the one or more top search result items having a better candidate score than unselected search result items; and
generate a search results presentation for display at the user's client device, the search results presentation comprising a presentation of the one or more top search result items.

16. The computer readable non-transitory storage medium of claim 15, the instructions to identify a plurality of search intents further comprising instructions to:
identify a plurality of possible interpretations of the search query; and
filter the plurality of possible interpretations of the search query to identify a plurality of selected interpretations of the search query using information from the at least one electronic messaging data store associated with the user, each selected interpretation corresponding to a search intent of the plurality of search intents.

17. The computer readable non-transitory storage medium of claim 15, the instructions to generate a search intent score further comprising instructions to:
generate, for each search intent of the plurality of search intents, a pre-retrieval score for the search intent, the search intent's pre-retrieval score representing a likelihood that the search intent is an accurate reflection of the search query's actual intent;
generate, for each search intent of the plurality of search intents, a post-retrieval score for the search intent, the search intent's post-retrieval score representing a likelihood that the search intent's search result list satisfies the search query;
generate, for each search intent of the plurality of search intents, a popularity score for the search intent; and
generate, for each search intent, the search intent score based on the search intent's pre-retrieval, post-retrieval and popularity scores.

18. The computer readable non-transitory storage medium of claim 17, the search intent's pre-retrieval score is personalized to the user.

19. The computer readable non-transitory storage medium of claim 17, the search intent's pre-retrieval score is generalized across a plurality of users.

20. The computer readable non-transitory storage medium of claim 15, the search results presentation comprising at least first and second presentation areas, the first presentation area is for use in presenting the one or more top search result items and the second presentation area is for use in presenting one or more of the unselected search result items.

21. The computer readable non-transitory storage medium of claim 20, the one or more unselected result items comprising a plurality of electronic messages presented in the second presentation area as a list sorted in chronological order.

* * * * *